Dec. 2, 1958 — D. E. LIPFERT — 2,862,319
CONVERTIBLE SLIDE VIEWER AND PROJECTOR
Filed June 20, 1955 — 3 Sheets-Sheet 1
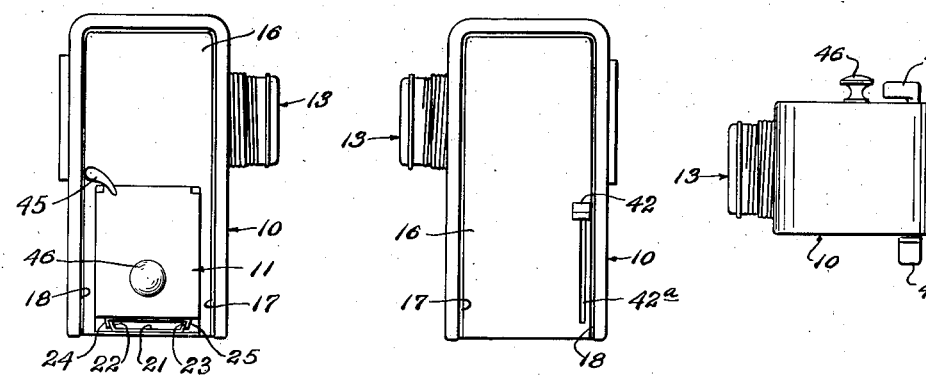
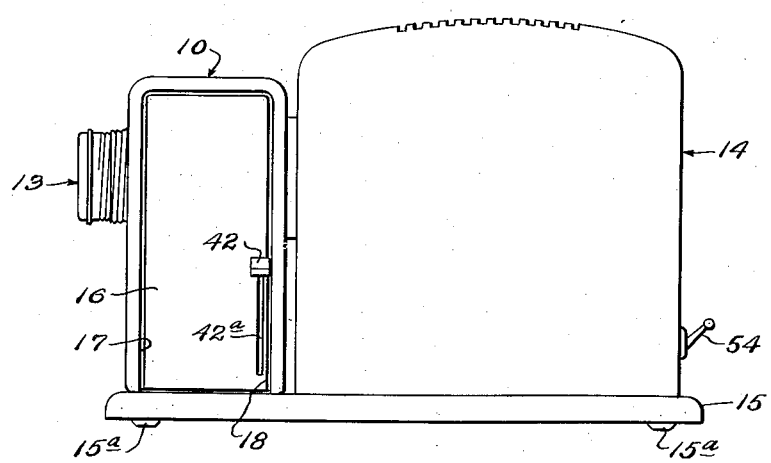
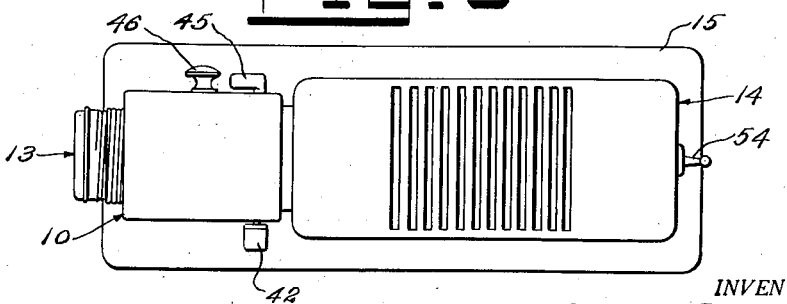
INVENTOR.
DONALD E. LIPFERT
BY
H. G. Manning
ATTORNEY Dec. 2, 1958  D. E. LIPFERT  2,862,319
CONVERTIBLE SLIDE VIEWER AND PROJECTOR
Filed June 20, 1955  3 Sheets-Sheet 2
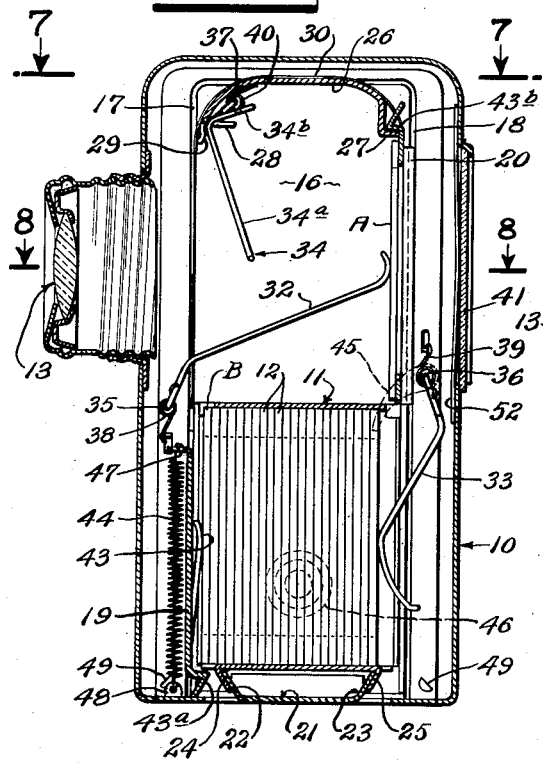
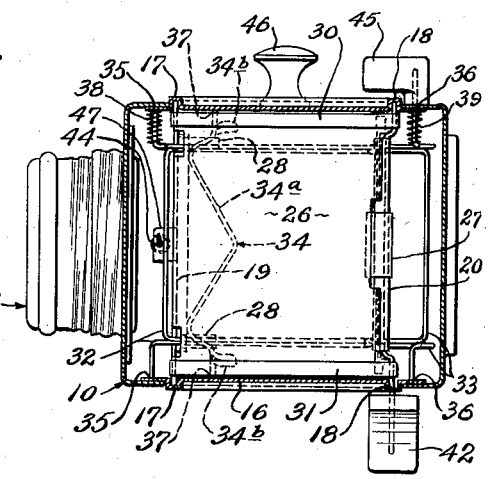
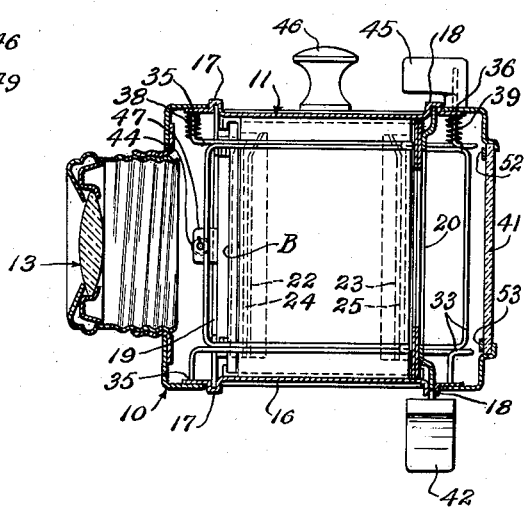
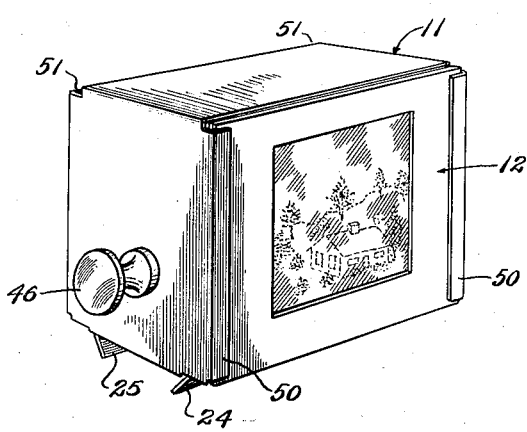
INVENTOR.
DONALD E. LIPFERT
BY
H. G. Manning
ATTORNEY Dec. 2, 1958   D. E. LIPFERT   2,862,319
CONVERTIBLE SLIDE VIEWER AND PROJECTOR
Filed June 20, 1955   3 Sheets-Sheet 3
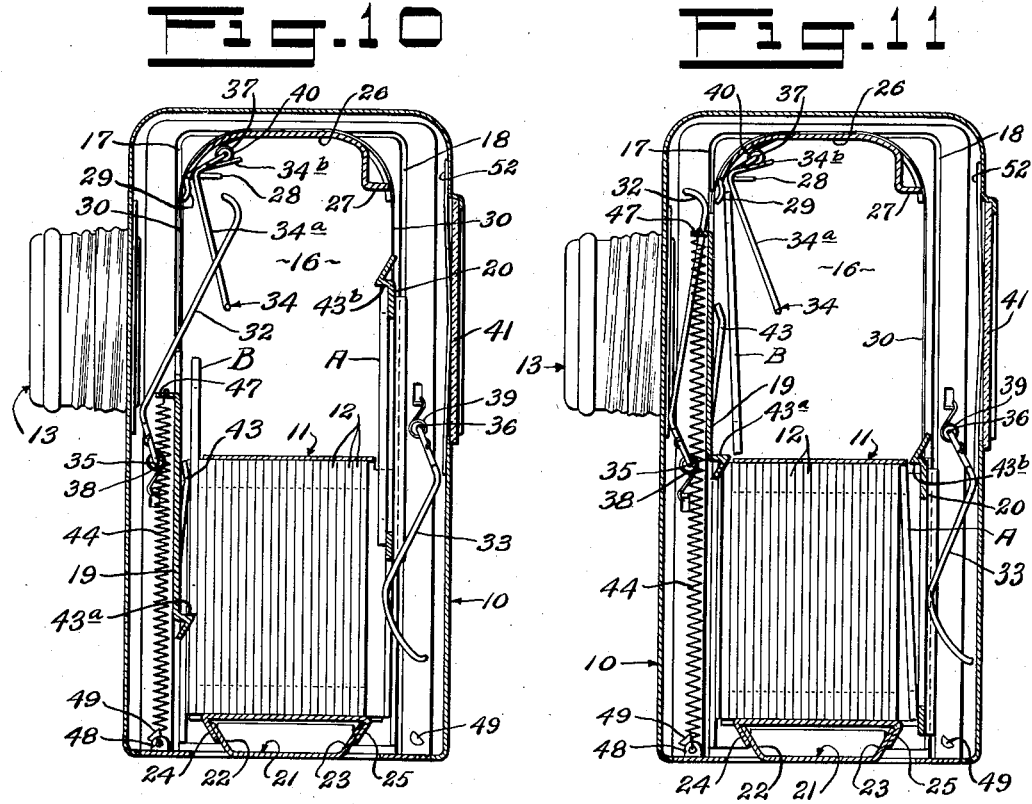
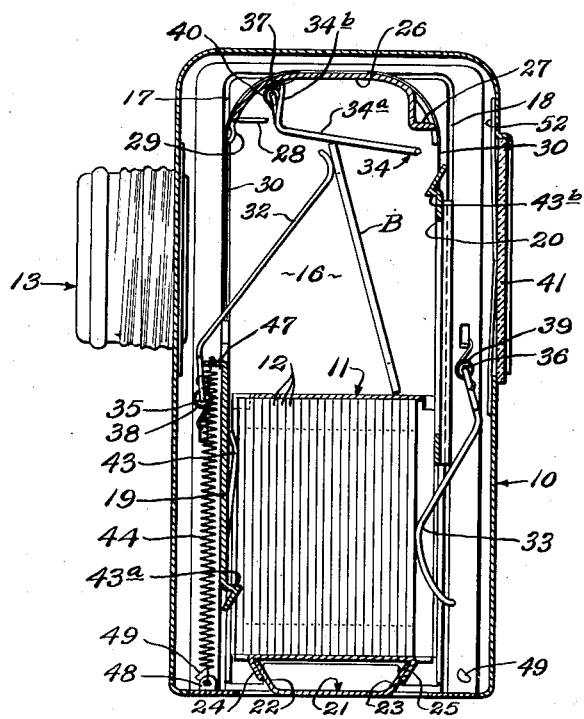
INVENTOR.
DONALD E. LIPFERT
BY
H. G. Manning
ATTORNEY

United States Patent Office 2,862,319
Patented Dec. 2, 1958

2,862,319

CONVERTIBLE SLIDE VIEWER AND PROJECTOR

Donald E. Lipfert, South Meriden, Conn.

Application June 20, 1955, Serial No. 516,415

5 Claims. (Cl. 40—79)

This invention relates to slide projection apparatus and more particularly to a hand viewer of the magazine type which is adapted to be detachably connected to a screen projector whenever desired.

One object of the present invention is to provide a device of the above nature which will be simple in construction, inexpensive to manufacture, easy to install and manipulate, compact, ornamental in appearance, and very efficient and durable in use.

With these and other objects in view, there has been illustrated on the accompanying drawings, one form in which the invention may conveniently be embodied in practice.

In the drawings,

Fig. 1 represents a side view of the assembled hand viewer and magazine.

Fig. 2 is a side view of the same, taken from the opposite side, showing the manually operated slide changing lever.

Fig. 3 is a top view of the same.

Fig. 4 is a side view of the projector and lamp housing, with the viewer assembled in operating position.

Fig. 5 is a top plan view of the same.

Fig. 6 is a longitudinal sectional view of the viewer, on a larger scale, showing the magazine in normal operating position.

Fig. 7 is a cross-sectional view, taken along the line 7—7 of Fig. 6.

Fig. 8 is a cross-sectional view, taken along the line 8—8 of Fig. 6.

Fig. 9 is a perspective view of the slide magazine, shown by itself.

Fig. 10 is a longitudinal sectional view, similar to Fig. 6, showing the position of the pack of slides in the magazine at the beginning of the slide-changing cycle, and showing a slide which has just been viewed, being carried downwardly for return to the magazine, and the next slide being carried upwardly into the top of the viewer.

Fig. 11 is a similar longitudinal sectional view, showing the viewed slide after it has been returned to the magazine, and the next slide being held at the top of the viewer, before it has been transferred into viewing position.

Fig. 12 is a similar longitudinal sectional view of the same, showing the viewed slide returned to the magazine, and the next slide in the act of being transferred into viewing position.

The present inventoin relates to slide viewing apparatus which includes a readily removable magazine containing a pack of slides, and manually controlled mechanism in said viewer for removing a slide from one end of the magazine, carrying it into viewing position, and then returning it to the other end of said magazine after being viewed.

Referring now to the drawings in which like reference numerals denote corresponding parts throughout the several views, the numeral 10 indicates a U-shaped cover for the viewing apparatus which is adapted to receive a rectangular slide magazine 11, which also serves as a file box for a pack of rectangular slides 12, at the bottom thereof. The magazine is provided on one side with a fixed handle knob 46.

The viewer contains a forward viewing lens 13 at its upper portion and is adapted to be detachably connected to a projecting apparatus 14 of any standard construction, whenever it is desired to use the apparatus for projection upon a screen.

The projector 14 has a base 15 provided with buttons 15a for resting on a table or other support.

Provision is also made of a hand view frame 16 which is U-shaped and has two pairs of vertical guide-ways 17 and 18 on the opposite interior sides thereof.

The slides 12 are adapted to be returned from the viewing position into the magazine 11 by means of a slide transfer member 20, and are also adapted to be carried from the magazine 11 into the upper viewing compartment by means of a slide transfer member 19.

Provision is also made at the bottom of the frame 16 of a horizontal dovetail track 21, having converging inclined fingers 22, 23 which are adapted to fit about a pair of inclined converging short ears 24, 25 carried by the bottom of the magazine 11.

At the top of the viewer 16, provision is made of a curved cross brace 26 which interfits with the frame 16, said brace 26 being provided with a rear horizontal stop 27 struck out from the material thereof, and a front stop 28 similarly struck out from said material at its outer edges, as shown most clearly in Fig. 7.

The forward end of the cross brace 26 is provided with a curved member 29 which assists in gripping the end slide B in cooperation with an L-shaped pressure finger 34 as shown in Fig. 11, so as to hold said slide positively in position without "flopping" during its transfer through the chamber at the top of the viewer.

Provision is also made of a pair of elongated flexible metal straps 30, 31 which are connected at their ends to the slide transfer members 19 and 20 and pass over the curved top brace 26, as clearly shown in Figs. 6, 10 and 12 of the drawing.

Provision is also made of a pair of S-shaped wire forked pressure fingers 32, 33 which press upon the front slide in the viewing compartment and the rear slide in the magazine 11, as clearly shown in Figs. 6 and 10 and 11 of the drawing.

The L-shaped pressure finger 34 at the top of the magazine has an angular top section 34a and a pair of lugs 34b for pressing forwardly on the slide B in the transfer chamber.

The fingers 32, 33, 34 are mounted on pivots 35, 36, 37, in the viewer frame, and are adapted to be urged against the slides 12 by means of torsion springs 38, 39, 40.

In order to permit the slides to be viewed from an exterior source of light (not shown), provision is made of a translucent plate 41 at the upper rear side of the viewer, against which the slide is pressed by the S-shaped finger 32. The plate 41 will of course be removed when projecting the slides on a screen.

A knob 42 is provided for shifting the slide from the rear to the front of the magazine, said knob being adapted to move freely within a vertical side slot 42a in the lower part of the viewer. The slide transfer member 19 is also provided with two struck out finger members 43, which permit the slides 12 to rock under the urging of the finger 34.

The transfer members 19 and 20 are provided with struck out fingers 43a, 43b, forming hooks for engaging the slides 12.

Provision is also made of an elongated tension coil return spring 44 connected to a lug 47 on the top of the slide transfer member 19 and a lug 48 on the bottom of the viewer frame 16, as clearly shown in Fig. 10 of the drawing. A magazine ejecting lever 45 is also provided on one side of the casing 16.

Provision is also made of a plurality of bent over lugs 49 which serve to hold the viewer cover 10 upon the viewer frame 16, said lugs passing through suitable openings formed in said frame.

The magazine 11 is provided with two pairs of vertical end flanges 50, 51 which are inturned to hold the slides in position (Fig. 9).

At the top of the cover 10 provision is made of a pair of rear depending leaf springs 52, 53 which press the translucent plate 41 rearwardly against the viewer frame 16.

In order to operate the projector lamp, provision is made of a switch 54 on the rear of the projector 14.

*Operation*

To change the slides, it will only be necessary to manually depress the knob 42. The viewed slide A will thus be moved downwardly from the viewing chamber and return to the magazine 11. At the same time, the member 19 will be operated to transfer the next slide B upwardly into the slide viewing chamber. The member 19 will then force the forked finger 32, to release the pressure on the next slide B. At the completion of this stroke, the upper edge of slide B will be forced under the pressure finger 34, which will cause the slide B to rock around the finger 43 on the slide carrier 19, in position to be held by the pressure finger 34.

When the manual knob 42 is released, the spring 44 will cause both slide transfer members 19, 20 to return to the positions shown in Fig. 6. In returning to this position the spring finger 32 drives the next slide B against the finger 34, which will rotate said finger until it releases the slide B, which will then be in position to be driven horizontally across the upper chamber into the viewing position shown in Fig. 6. At the same time, the slide A is pressed into the magazine 11 by the finger 33.

It will also be understood that the curved member 29 will grip the slide B in conjunction with the finger 34, thus positively holding the slide B from flopping over in the central part of the transfer chamber.

Thus, when the slide 12 entering the viewing compartment reaches the top of its stroke, its upper end is pressed against the curved end 29 of the cross brace 26, where it is also gripped by the third spring finger 34. The slide 12 is held in this position until the first spring finger 32 also contacts the slide. Then the slide is forced toward the translucent plate 41, the bottom edge of the slide moving at a more rapid rate than the upper edge so that it reaches its locating surface first. Then the upper edge of the slide 12 lifts the third spring finger 34 which pushes downwardly on the slide to keep it under control during the whole transfer. In other words, the slide 12 is actually handled by these two spring fingers 32 and 34.

During transfer across the viewing compartment, the third spring finger 34 first presses against one side of the slide and then gradually shifts its pressure to the edge of the slide.

The magazine 11 may readily be removed, whenever desired, by deflecting the spring finger 33 by means of the ejecting lever 45, and pulling the magazine out by means of the knob 46, whereupon another magazine of slides may be readily inserted.

It will be understood that after all of the slides in the magazine 11 have been viewed, a special dummy slide (not shown) may be left in the viewer, such slide being preferably marked with red or other distinguishing color to indicate that it is such a special slide, and is not to be removed from the viewer with the pack of slides normally carried in the magazine.

If desired, mechanism (not shown) may be provided to return the last slide to the magazine and prevent another slide from being forced upwardly into viewing position by means of the slide transfer member 19.

The present invention comprises a unique slide filing system which is suited to convenient viewing or projecting.

The viewer may be used either with natural or artificial light and may very easily be attached and detached from the projector whenever desired.

While there has been disclosed in this specification, one form in which the invention may be embodied, it is to be understood that this form is shown for the purpose of illustration only and that the invention is not limited to the specific disclosure, but may be modified and embodied in various other equivalent forms without departing from its spirit.

In short, the invention includes all the modifications and embodiments coming within the scope of the following claims.

Having thus fully described the invention what is claimed as new and for which it is desired to secure Letters Patent is:

1. In a slide viewer, a housing having a magazine compartment at one end thereof and a viewing compartment at its other end, a rectangular magazine containing a stack of transparent photographic slides arranged face to face therein, said viewing compartment including a lens at one end and a translucent plate at its opposite end for receiving a source of light, a slidable opaque transfer member in the lens end of said housing for carrying slides from said one end of said stack to the lens end of said viewing compartment, a second slidable apertured transfer member at the translucent plate end of said viewing chamber for carrying said slide back to the opposite end of said stack after being viewed by a source of light through the aperture in said second transfer member, a spring finger pressing the front slide toward said translucent plate, a second spring finger pressing said rear slide against said pack, and a third spring finger mounted in the top of the lens end of said viewing chamber for gripping the upper edge of the slide while being transferred from the lens end to the translucent plate end of said viewing chamber as it is being pushed by the finger on said first transfer member.

2. The invention as defined in claim 1, in which said first and second pressure fingers are pivotally mounted in the sides of said transfer compartment.

3. The invention as defined in claim 2, in which each of said pressure fingers is provided with a torsion coil spring surrounding the pivot thereof.

4. In a slide viewer, a U-shaped housing frame having a pair of depending legs, a bottom magazine detachably mounted therein, said magazine containing a stack of rectangular slides arranged face to face, said frame having a slide viewing compartment at the upper end thereof, including a lens at one end of said compartment and a detachable translucent plate at the other end thereof, said frame also comprising two pairs of interior vertical tracks on its opposite legs, a transfer member for carrying said slide from one end of said magazine to said compartment, a second transfer member to carry said slide from said compartment back to said magazine, said transfer members being mounted to travel in the tracks of said legs, a pair of flexible straps connected to the tops of said transfer members, a curved cross brace at the top of said U-shaped frame for guiding said transfer straps during reciprocating movement of said slide members in said tracks, means to simultaneously return a slide which has just been viewed to the rear of said magazine and to move the next slide from the front of said magazine into said upper viewing compartment, and means to transfer said next slide across said compartment into proximity with said translucent plate, said transfer means including a first spring finger pressing said slide toward said translucent plate, and a second spring finger mounted on the top of the lens end of said viewing chamber for gripping the upper edge of said slide while it is being transferred from said lens end to the translucent plate end of said viewing chamber while being pushed by the first spring finger.

5. The invention as defined in claim 4, in which provision is made of a coil spring connecting said frame to one of said transfer members to automatically return both members to their original positions after a slide has moved from viewing position to the rear of said magazine.

References Cited in the file of this patent

UNITED STATES PATENTS

| | | |
|---|---|---|
| 2,226,367 | Boline | Dec. 24, 1940 |
| 2,516,793 | Mueller | July 25, 1950 |
| 2,617,218 | Antos | Nov. 11, 1952 |
| 2,705,437 | Lessman | Apr. 5, 1955 |

FOREIGN PATENTS

| | | |
|---|---|---|
| 205,792 | Great Britain | May 1, 1924 |
| 406,861 | France | Dec. 17, 1909 |
| 667,104 | France | June 3, 1929 |